(12) United States Patent
Derby, V.

(10) Patent No.: US 7,240,756 B2
(45) Date of Patent: Jul. 10, 2007

(54) METHOD OF OPERATOR PRESENCE CONTROL ON WALK BEHIND POWERED EQUIPMENT

(75) Inventor: Harry L. Derby, V., Charlotte, NC (US)

(73) Assignee: Textron Inc., Providence, RI (US)

( * ) Notice: Subject to any disclaimer, the term of this patent is extended or adjusted under 35 U.S.C. 154(b) by 426 days.

(21) Appl. No.: 10/851,989

(22) Filed: May 21, 2004

(65) Prior Publication Data

US 2005/0257964 A1 Nov. 24, 2005

(51) Int. Cl.
*B62L 3/02* (2006.01)
*B62K 28/04* (2006.01)
*B62D 1/14* (2006.01)

(52) U.S. Cl. ..................... 180/272; 180/332

(58) Field of Classification Search ............... 56/10.1, 56/10.5, 10.8, 11.3, 11.6; 180/19.3, 272, 180/332, 333; 172/35, 42, 75; 192/32, 47; 16/430, 112.1
See application file for complete search history.

(56) References Cited

U.S. PATENT DOCUMENTS

| | | | |
|---|---|---|---|
| 2,335,054 A | 11/1943 | Godwin | |
| 3,514,926 A | 6/1970 | Heth et al. | |
| 3,581,480 A | 6/1971 | O'Connor | |
| 3,841,069 A | 10/1974 | Weck | |
| 3,946,543 A | 3/1976 | Templeton | |
| 4,117,651 A | 10/1978 | Martin, Jr. | |
| 4,281,732 A * | 8/1981 | Hoch | 180/19.3 |
| 4,322,934 A | 4/1982 | Doi | |
| 4,327,539 A | 5/1982 | Bricko et al. | |

(Continued)

FOREIGN PATENT DOCUMENTS

GB 348059 4/1931

(Continued)

OTHER PUBLICATIONS

Toro Commercial Products brochure, "Greensmaster Walk Mowers", 1998.

(Continued)

*Primary Examiner*—Lesley D. Morris
*Assistant Examiner*—Daniel Yeagley
(74) *Attorney, Agent, or Firm*—Harness, Dickey & Pierce, P.L.C.

(57) ABSTRACT

A walk behind powered apparatus having a mobile structure, a work implement drive system coupled to the mobile structure, a power device driving the work implement, and a handle structure coupled to the mobile structure. The handle structure includes a cam slot having a first portion and a second portion. The second portion is orthogonal to the first portion. A bail member is pivotally coupled to the handle structure and includes a pin extending therefrom. The pin cammingly engaging the slot such that when the bail member is in a first position the pin is disposed in the first portion of the slot and when the bail member is in a second position the pin is disposed in the second portion of the slot. A switch device is coupled to the work implement drive system and selectively actuates the work implement drive system in response to the movement of the bail member between the first position and the second position. A biasing member biases the bail member into the first position to prevent inadvertent actuation of the switch device.

10 Claims, 5 Drawing Sheets

U.S. PATENT DOCUMENTS

| | | | |
|---|---|---|---|
| 4,354,149 A | 10/1982 | Armond et al. | |
| 4,573,307 A * | 3/1986 | Wick | 56/11.8 |
| 4,580,455 A | 4/1986 | Beugelsdyk et al. | |
| 4,769,976 A | 9/1988 | Bassett et al. | |
| 4,835,409 A | 5/1989 | Bhagwat et al. | |
| 4,854,540 A | 8/1989 | Balek | |
| 4,882,897 A * | 11/1989 | Oshima et al. | 56/11.3 |
| 4,995,227 A | 2/1991 | Foster | |
| 5,195,307 A | 3/1993 | Thorud et al. | |
| 5,203,147 A * | 4/1993 | Long | 56/10.1 |
| 5,375,674 A * | 12/1994 | Peter | 180/19.3 |
| 5,394,678 A | 3/1995 | Lonn | |
| 5,402,626 A | 4/1995 | Zinck | |
| 5,412,932 A | 5/1995 | Schueler | |
| 5,442,901 A | 8/1995 | Niemela et al. | |
| 5,490,370 A | 2/1996 | McNair | |
| 5,533,326 A | 7/1996 | Goman et al. | |
| 5,606,851 A | 3/1997 | Bruener | |
| 5,628,169 A | 5/1997 | Stiller et al. | |
| 5,727,372 A | 3/1998 | Kanitz et al. | |
| 5,735,064 A * | 4/1998 | Holl | 37/260 |
| 5,784,868 A * | 7/1998 | Wadzinski et al. | 56/10.8 |
| 5,909,064 A | 6/1999 | Feil et al. | |
| 5,937,622 A | 8/1999 | Carrier et al. | |
| 5,950,409 A | 9/1999 | Davies | |
| 6,006,390 A | 12/1999 | Bischel et al. | |
| 6,047,786 A | 4/2000 | Stevenson et al. | |
| 6,082,083 A * | 7/2000 | Stalpes et al. | 56/11.6 |
| 6,098,388 A | 8/2000 | Davies | |
| 6,125,621 A | 10/2000 | Burch | |
| 6,170,241 B1 | 1/2001 | Shibilski et al. | |
| 6,644,002 B2 * | 11/2003 | Trefz | 56/10.8 |

FOREIGN PATENT DOCUMENTS

| | | |
|---|---|---|
| GB | 875842 | 8/1961 |
| GB | 985287 | 12/1963 |
| GB | 1128265 | 9/1968 |
| GB | 1223611 | 2/1971 |
| WO | WO 97/28681 | 8/1997 |

OTHER PUBLICATIONS

Toro Commercial Products brochure, "Greensmaster 1000 and Greensmaster 500", Feb. 1994.

Toro Commercial Products brochure, "Greensmaster Walk Mowers—Greensmaster 500 Specifications", 1998.

Saxon Industries brochure, "Saxon 22 Inch Floating Head Greens Mower", Feb. 2001.

The Toro Company brochure, "Toro Greensmaster Flex 21", Feb. 2001.

TurfNet Monthly brochure, "Toro to Unleash Greensmower" Product Profile, Dec. 2000.

TurfNet Monthly brochure, "Wear Both Hats" vol. 7 No. 12, Dec. 2000.

Saxon brochure, "Baroness Twin Greens Mower", Feb. 2001.

Kyoeisha Co., Ltd., Owner's Handling Manual & Parts Catalog.

Kyoeisha Co., Ltd., Additional Manual & Parts Catalog for Saxon Model.

Kyoeisha co., Ltd., Baroness Turfgrass Industry.

Shibaura, Green.

Kyoeisha Co., Ltd., Baroness LM54GA-R-LM54GAS-R.

* cited by examiner

METHOD OF OPERATOR PRESENCE CONTROL ON WALK BEHIND POWERED EQUIPMENT

FIELD OF THE INVENTION

The present invention relates to walk behind powered equipment and, more particularly, relates to a walk behind powered equipment having an improved operator presence system.

BACKGROUND OF THE INVENTION

As is known in the art, walk behind powered equipment is often used in a wide variety of applications, such as lawn mowers, greens mowers, roto-tillers, aerators, snowblowers, and the like. Walk behind powered equipment typically includes an engine, either an internal combustion engine and/or electric motor, that is used to power a drive system and/or implement disengagement systems to propel the unit and operate the device, respectively. In the interest of safety, it is well known to use an operator presence system that must be triggered by an operator to ensure positive control of the powered equipment.

To this end, many known operator presence systems utilize a two stage detection system. For example, with regard to drive systems, a first stage includes actuation of a bail member into a retained position—typically by a gripping motion by the operator. Once the bail member has been gripped and retained, the drive lever is then unlocked and, thus, may be actuated by the operator to command forward or reverse movement. Alternatively, some systems employ a lockout lever that must first be actuated by the operator before a bail member can be squeezed to command movement or implement engagement.

Unfortunately, these prior art designs often suffer from a number of disadvantages. Specifically, known operator presence systems often require cumbersome actuation—that is, the simultaneous actuation of multiple levers to command a single drive movement or implement engagement. Such cumbersome actuation of the controls may inhibit the efficient use and controllability of the equipment. Additionally, such prior art designs often require extensive and complicated mechanical or electrical systems. Over time, these complex systems invariably suffer from failure and/or increased maintenance. Still further, the added complexity of these systems often lead to increased production costs.

Accordingly, there exists a need in the relevant art to provide an operator presence system for powered equipment that is capable of simply and reliably detecting the presence of an operator before permitting commanded operations. Furthermore, there is a need in the relevant art to provide an operator presence system for powered equipment that overcomes the disadvantages of the prior art.

SUMMARY OF THE INVENTION

According to the principles of the present invention, walk behind powered apparatus having an advantageous construction is provided. The walk behind powered apparatus includes a mobile structure, a work implement drive system coupled to the mobile structure, a power device driving the work implement, and a handle structure coupled to the mobile structure. The handle structure includes a cam slot having a first portion and a second portion. The second portion is orthogonal to the first portion. A bail member is pivotally coupled to the handle structure and includes a pin extending therefrom. The pin cammingly engaging the slot such that when the bail member is in a first position the pin is disposed in the first portion of the slot and when the bail member is in a second position the pin is disposed in the second portion of the slot. A switch device is coupled to the work implement drive system and selectively actuates the work implement drive system in response to the movement of the bail member between the first position and the second position. A biasing member biases the bail member into the first position to prevent inadvertent actuation of the switch device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses. For example, the present invention may find utility in a wide variety of applications, including use in lawn mowers, greens mowers, roto-tillers, aerators, snowblowers, and the like. However, in the following description, the present invention will be described in connection with a greens mower. Such description should not be regarded as limiting the present invention.

Figure 1:
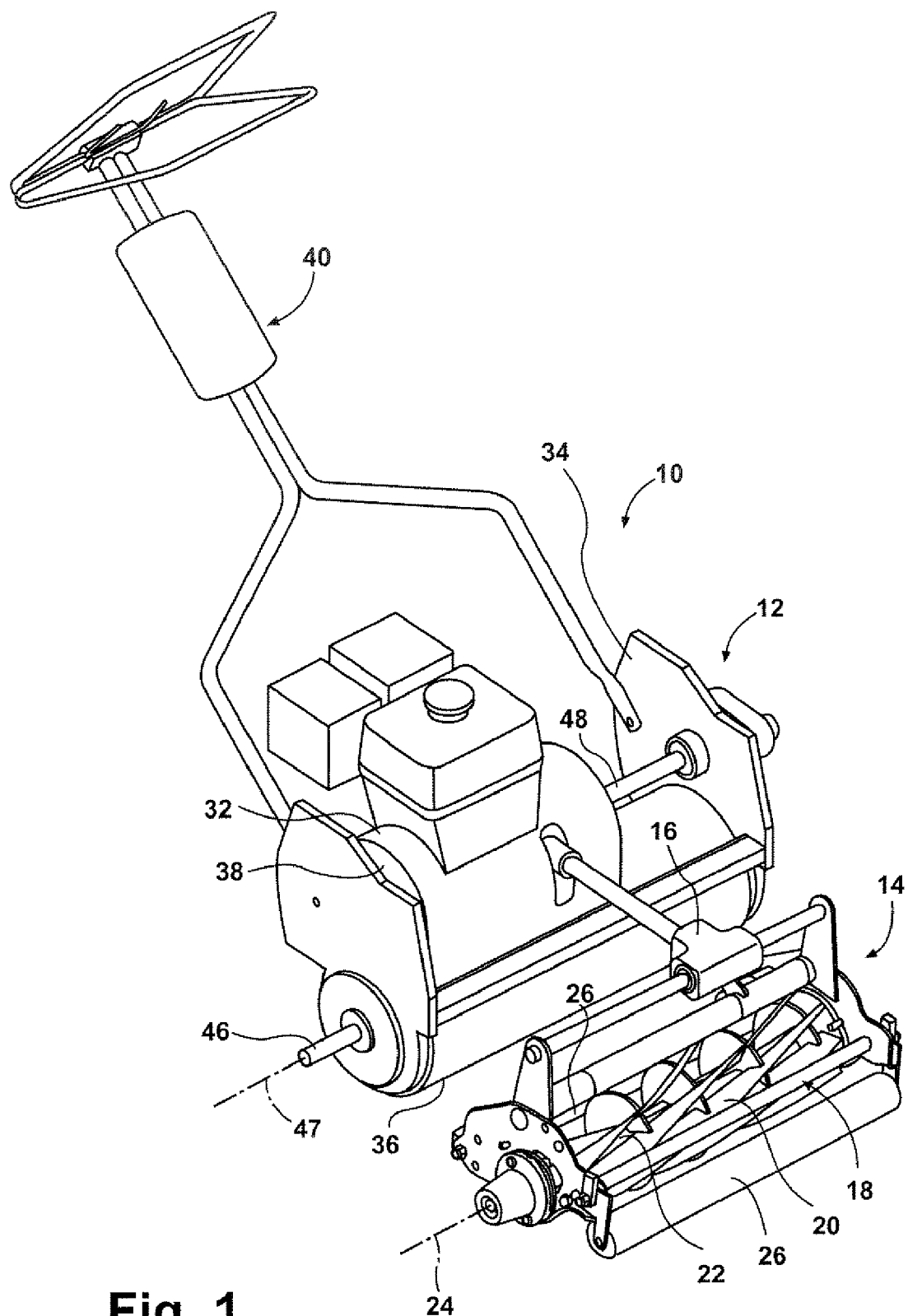
FIG. 1 is a perspective view illustrating a walk behind powered apparatus according to the principles of the present invention.

With reference to the figures, FIG. 1 illustrates a greens mower 10 incorporating the principles of the present invention. Greens mower 10 is a reel-type mower having a base portion 12 and a floating or articulating mowing unit 14. Mowing unit 14 is articulately coupled to base portion 12 through a pivoting mechanism 16.

Figure 2:
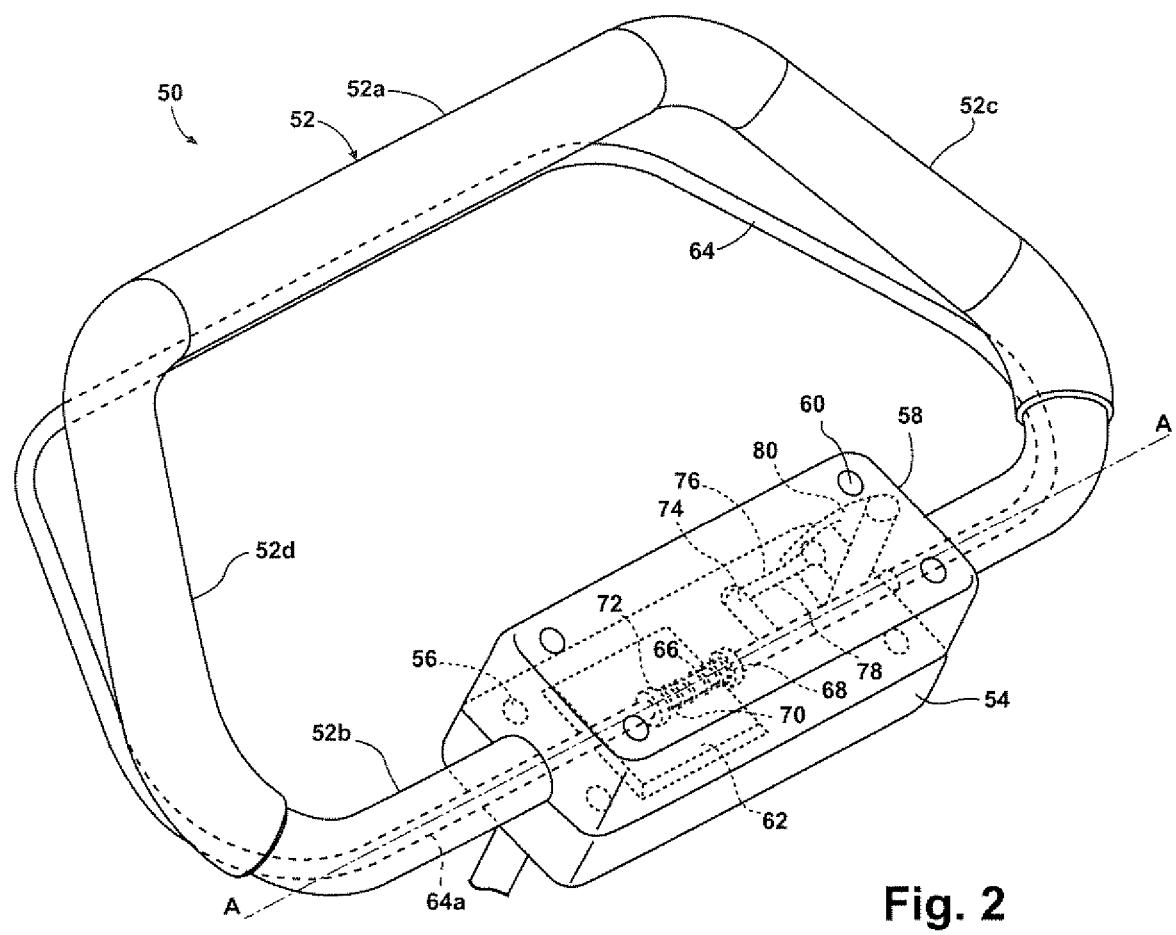
FIG. 2 is an enlarged perspective illustrating an operator presence system according to the present invention.

Mowing unit 14 includes a rotatable greens mower reel 18 having spiraled blades 20 equally spaced around a reel shaft 22. As best seen in FIG. 2, reel shaft 22 is generally elongated and defines a rotation axis 24 extending along the length of reel shaft 22. A conventional fixed bed knife (not shown) is operably mounted to mowing unit 14. Blades 20 orbit relative to shaft 22 and move past the fixed bed knife for the usual and well-known function of cutting the grass. Mowing unit 14 further includes a pair of ground engaging rollers 26 (FIG. 1) rotatably mounted along a forward and rearward portion of mowing unit 14. The pair of ground engaging rollers 26 serve to support mowing unit 14 for movement on the ground. The pair of ground engaging rollers 26 are preferably adjustable to define a cutting height.

Base portion 12 generally includes an internal combustion engine 32, a frame 34, a lawn roller 36, a drive system 38, and a handle assembly 40. Internal combustion engine 32 is of conventional design and is mounted on frame 34.

Lawn roller 36 is rotatably mounted to frame 34 through a roller axle 46. Lawn roller 36 supports base portion 12 on the ground and serves as the traction drive for greens mower 10. Other ground-supporting traction members could be substituted. Drive system 38 is operably coupled between an output shaft 48 and lawn roller 36. Drive system 38 generally includes a drive pulley (not shown) mounted to output shaft 48 for rotation therewith and an idler pulley (not shown) mounted to lawn roller 36 for rotation therewith. A drive belt (not shown) extends between the drive pulley and the idler pulley to transfer drive force from internal combustion engine 32 to lawn roller 36. Thus, there exists a traction drive train from internal combustion engine 32 to the ground-engaging lawn roller 36 capable of driving greens mower 10 in at least a forward direction.

As best seen in FIGS. 1 and 2, greens mower 10 further includes an operator presence system 50. Operator presence system 50 is provided for ensuring that an operator has positive control prior to commanding a control operation. In this regard, an operator can easily actuate operator presence system 50 through a single system, rather than the complex multi-lever systems of the prior art.

Operator presence system 50 generally includes a handle member 52 operably coupled to handle assembly 40. Handle member 52 is generally trapezoidal in shape having top and bottom parallel portions 52a, 52b and generally inwardly inclined side portions 52c, 52d. Specifically, operator presence system 50 includes a base plate 54 that is fastened to handle assembly 40 via known methods, such as clamps, fasteners, or the like. Base plate 54 is preferably formed of a molded material and is generally rectangular shaped. A plurality of fastener holes 56 are formed in base plate 54 for coupling base plate 54 to handle assembly 40.

Operator presence system 50 further includes a top plate 58, formed integrally with handle member 52, that is coupled to base plate 54 via fasteners disposed within apertures 60. Base plate 54 includes a ramped surface 62 formed therein for supporting and retaining bottom portion 52b of handle member 52. Ramped surface 62 may includes key features adapted to cooperate with corresponding features formed in handle member 52 to prevent relative movement of handle member 52 and base plate 54.

Operator presence system 50 further includes a bail member 64 pivotally coupled between base plate 54 and top plate 58. Bail member 64 is pivotally movable about an axis A—A. Preferably, bail member 64 is similarly shaped as handle member 52 so as to provide comfortable gripping surface for the operator.

Bail member 64 is biased into a first position (shown in FIG. 2) extended from handle member 52 via a spring member 66. Spring member 66 is preferably a compression spring having a first end 68 engaging a portion of base plate 54 and a second end 70 engaging a flange 72 formed in bail member 64.

Bail member 64 further includes a finger member 74 extending orthogonally from a lower portion 64a of bail member 64 and movable with bail member 64. Finger member 74 is shaped to engage a slot 76 formed in base plate 54. Slot 76 is preferably shaped to include a first portion 78 extending parallel to axis A—A. Slot 76 further includes a second portion 80 extending orthogonal to axis A—A. The particular motion of finger member 74 relative to slot 76 will be described in detail below.

Figure 3:
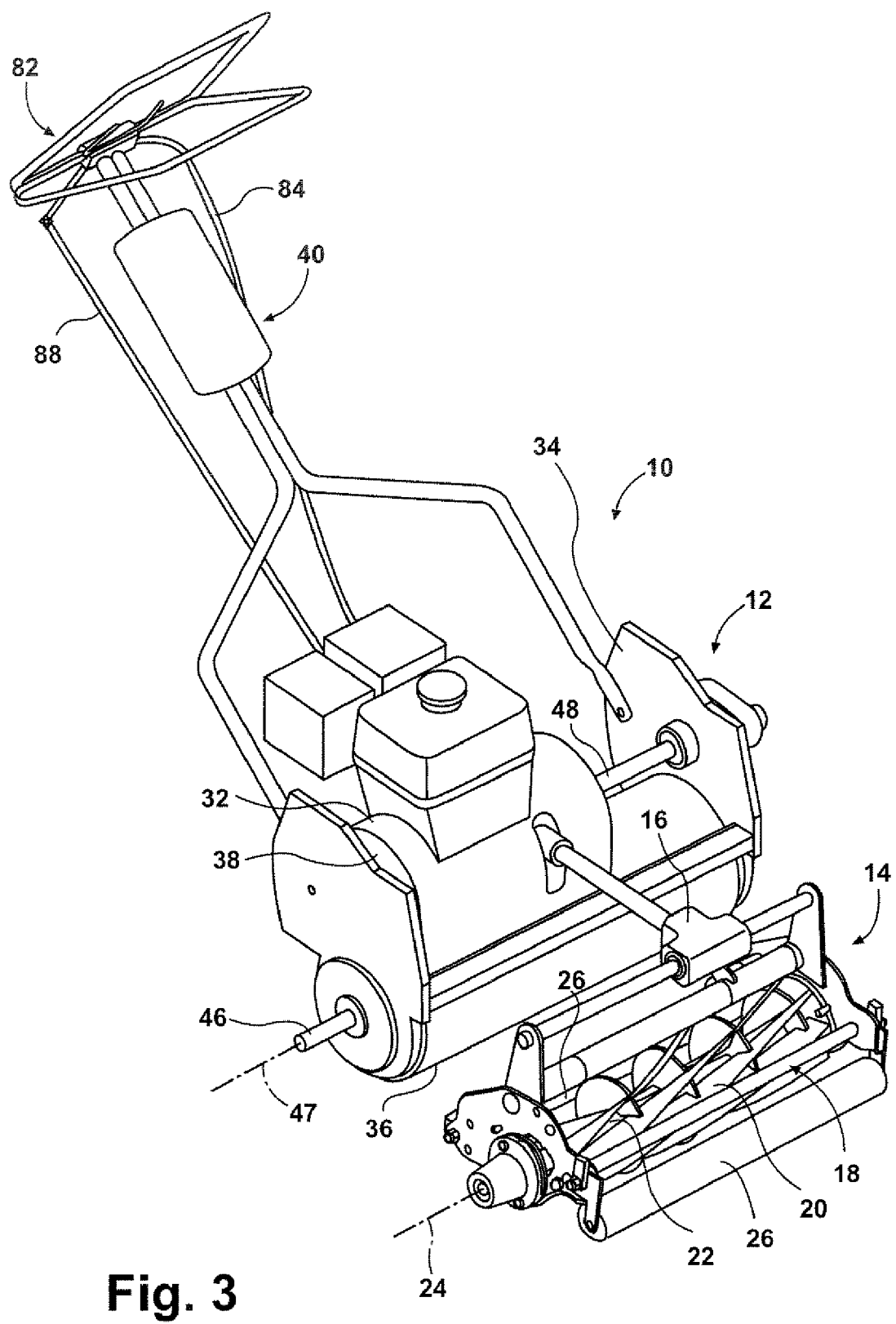
FIG. 3 is a perspective view similar to FIG. 1 illustrating both a cable and linkage system which can be used for a switching device.
Figure 4:
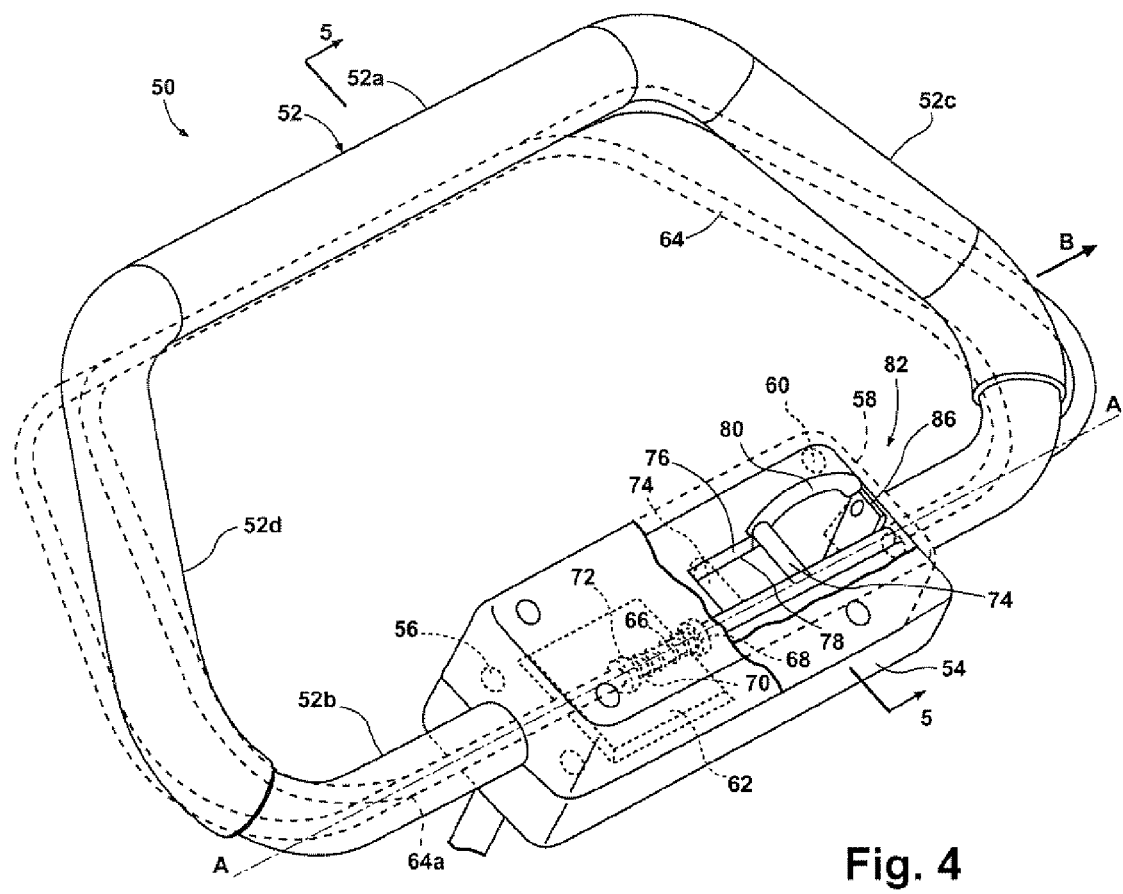
FIG. 4 is an enlarged perspective view similar to FIG. 2 illustrating details of the operator presence system.

As shown in FIGS. 3 and 4, bail member 64 further includes a switching device 82. Switching device 82 is operably coupled to engine 32, drive system 38, and/or mowing unit 14 so as to provide a control signal to any of these systems to control the operation thereof in response to detection or absence of an operator input. In this regard, switch device 82 may be a cable 84 that is actuated in response to the rotating action of bail member 64, an electrical switch 86 that is opened or closed in response to contact from finger member 74, or a linkage system 88 that is actuated in response to rotating action of bail member 64. An example of such a system is disclosed in commonly-owned U.S. Pat. No. 6,523,334, which is incorporated herein by reference.

Figure 5:
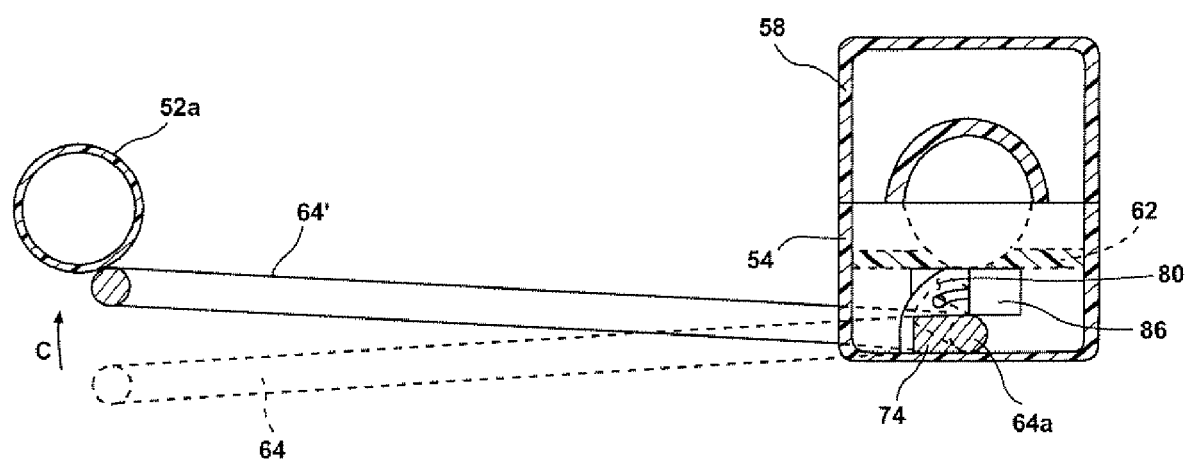
FIG. 5 is a cross sectional view taken at section 5—5 of FIG. 4.

During operation, bail member 64 is first in a relaxed and locked position (see FIG. 2). In this position, the presence of an operator is not detected. To position bail member 64 in a retracted position, thereby signaling the presence of an operator, as shown in FIG. 4 an operator must first translate bail member 64 along axis A—A in a direction B against the opposing biasing force of spring member 66. During this translating movement, finger member 74 is disposed in first portion 78 of slot 76. The engaging contact of finger member 74 against the walls of first portion 78 of slot 76 prevents rotational movement of bail member 64 about axis A—A until bail member 64 translates a predetermined distance. Once bail member 64 has been translated along axis A—A in direction B, finger member 74 is then received within second portion 80 of slot 76. As shown in FIG. 5, because second portion 80 of slot 76 is orthogonal to axis A—A, bail member 64 is then permitted to rotate about axis A—A, against the force of gravity in an upward direction C, into a position generally adjacent handle member 52 to define a fully retracted position. This fully retracted position thus signals the presence of an operator. Once bail member 64 is in this fully retracted position, switching device 82 is activated to command operation of engine 32, drive system 38, and/or mowing unit 14.

When the operator releases bail member 64, bail member 64 rotates in an opposite direction about axis A—A under the force of gravity as finger member 74 translates in second portion 80 of slot 76. Once finger member 74 is received within first portion 78 of slot 76, the biasing force of spring member 66 then urges bail member 64 laterally relative to axis A—A, thereby returning bail member 64 to the relaxed and locked position shown in FIG. 2.

As can be appreciated, the present invention provides a simple and convenient method of providing operator presence detection without requiring complex actuation of multiple levers and/or the use of complex and costly systems. The present invention overcomes the disadvantages of the prior art through the use of a novel system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A walk behind powered apparatus comprising:
   a mobile structure;
   a work implement drive system operably coupled to said mobile structure;
   a work implement operably moved by said work implement drive system;

a power device moving said work implement through said work implement drive system;

a handle assembly coupled to said mobile structure, said handle assembly having:

a base plate and a top plate connected to said base plate;

a handle member frictionally received between said base plate and said top plate and thereby fixed to said handle assembly;

a slot created in said base plate, said slot having a first portion and a second portion, said second portion being generally orthogonal to said first portion;

a bail member pivotally coupled to said handle member using said base plate and said top plate, said bail member having an extension extending orthogonally therefrom and directly movable with said bail member, said extension cammingly engaging said slot such that when said bail member is in a first position said extension is disposed in said first portion of said slot preventing rotation of said bail member with respect to said handle member and when said bail member is in a second position said extension is disposed in said second portion of said slot allowing rotation of said bail member with respect to said handle member;

a switching device coupled to said work implement drive system, said switching device operable to selectively actuate said work implement drive system in response to said movement of said bail member between said first position and said second position; and a biasing member biasing said bail member into said first position to prevent inadvertent actuation of said switch device.

2. The walk behind powered apparatus according to claim 1 wherein said switching device includes an electrical switch outputting a control signal to said work implement drive system in response to movement of said bail member from said first position to said second position.

3. The walk behind powered apparatus according to claim 1 wherein said switching device includes a cable system outputting a control movement to said work implement drive system in response to movement of said bail member from said first position to said second position.

4. The walk behind powered apparatus according to claim 1 wherein said switching device includes a linkage outputting a control movement to said work implement drive system in response to movement of said bail member from said first position to said second position.

5. The walk behind powered apparatus according to claim 1, further comprising a lawn roller, wherein said work implement drive system is operably coupled to said lawn roller to provide at least a forward direction drive motion.

6. The walk behind powered apparatus according to claim 1 wherein said work implement is a reel mowing unit.

7. A walk behind powered apparatus comprising:

a mobile structure;

a work implement drive system operably coupled to said mobile structure;

a work implement operably driven by said work implement drive system;

a power device driving said work implement through said work implement drive system;

a handle structure coupled to said mobile structure, said handle structure having a base plate and a top plate and a handle member fixedly coupled to said base plate using said top plate;

a cam slot formed in said handle structure, said cam slot having a first portion and a second portion each created in said base plate, said second portion being generally orthogonal to said first portion;

a bail member pivotally coupled to said handle structure, said bail member having an pin extending orthogonally therefrom, said pin cammingly engaging said cam slot such that when said bail member is in a first position said pin is disposed in said first portion of said cam slot preventing rotation of said bail member and when said bail member is in a second position said pin is disposed in said second portion of said cam slot permitting rotation of said bail member;

a switching device coupled to said work implement drive system, said switching device operable to selectively actuate said work implement drive system in response to said rotation of said bail member; and a biasing member biasing said bail member into said first position to prevent inadvertent actuation of said switching device.

8. A walk behind powered apparatus, comprising:

a mobile structure;

a drive system operably coupled to the mobile structure;

a reel mower supported from the mobile structure;

a power device connected to the drive system operable to propel the apparatus; and a handle assembly coupled to the mobile structure, the handle assembly including:

a handle;

a top plate integrally connected to the handle;

a base plate fastenably connectable to the top plate, operable to non-rotatably fix the handle between the base plate and the top plate;

a slot having a first portion and a second portion defining an arc-shape each created in the base plate, the second portion oriented generally orthogonal to the first portion; and a bail pivotally and axially coupled with respect to the handle to the base plate, the bail having an orthogonally extending finger directly movable with the bail, the finger positioned within the slot such that when the bail is in a first position the finger is positioned in the first portion of the slot preventing rotation of the bail with respect to the handle, the bail translatable by axial movement to a second position having the finger positioned in the second portion of the slot allowing rotation of the finger within the arc-shaped second portion allowing rotation of the bail with respect to the handle.

9. The walk behind powered apparatus according to claim 8, further comprising:

an extending portion of the base plate operable to at least rotatably receive the bail;

a flange connected to the bail; and a biasing member positioned between the extending portion and the flange operable to bias the bail toward the first position.

10. The walk behind powered apparatus according to claim 8, further comprising a switching device communicating between the handle assembly and both the drive system and the reel mower, the switching device operable to selectively actuate both the drive system and the reel mower in response to rotation of the bail member.

* * * * *